United States Patent
Yamamoto

[11] Patent Number: 5,883,461
[45] Date of Patent: Mar. 16, 1999

[54] SUPPORTING STRUCTURE OF VIBRATOR

[75] Inventor: Shigeto Yamamoto, Shiga-Ken, Japan

[73] Assignee: Murata Manufacturing Co., Ltd., Kyoto-fu, Japan

[21] Appl. No.: 831,741

[22] Filed: Apr. 1, 1997

Related U.S. Application Data

[63] Continuation of Ser. No. 443,194, May 17, 1995, abandoned.

[30] Foreign Application Priority Data

May 23, 1994 [JP] Japan .................................... 6-108427

[51] Int. Cl.$^6$ .................................................... H01L 41/08
[52] U.S. Cl. ............................................ 310/351; 310/321
[58] Field of Search .................................. 310/348–353, 310/321, 368

[56] References Cited

U.S. PATENT DOCUMENTS

| | | | |
|---|---|---|---|
| 1,907,986 | 5/1933 | Little | 310/353 X |
| 4,025,806 | 5/1977 | Weber | 310/352 |
| 4,550,475 | 11/1985 | Ishigami et al. | 310/351 X |
| 4,836,023 | 6/1989 | Oikawa | 310/351 X |
| 5,254,989 | 10/1993 | Terajima | 310/353 X |
| 5,256,929 | 10/1993 | Ferajima | 310/352 X |
| 5,430,342 | 7/1995 | Watson | 310/352 X |
| 5,493,166 | 2/1996 | Kasanami et al. | 310/351 |
| 5,497,044 | 3/1996 | Nakamura et al. | 310/348 |
| 5,635,641 | 6/1997 | Kakehi et al. | 310/351 X |

FOREIGN PATENT DOCUMENTS

| | | | |
|---|---|---|---|
| 0138315 | 10/1981 | Japan | 310/352 |
| 3-34613A | 6/1989 | Japan | 310/351 |
| 3-13006 | 1/1991 | Japan | 310/351 |

*Primary Examiner*—Mark O. Budd
*Attorney, Agent, or Firm*—Nikaido, Marmelstein, Murray & Oram LLP

[57] ABSTRACT

A vibrating gyroscope having a supporting structure of a vibrator including, for example, a substantially regular triangular prism-shaped vibrating body. The vibrating body is formed with materials generally generating a mechanical vibration such as a constant-elastic materials. On three side faces of the vibrating body, three piezoelectric elements are formed respectively. On a ridge-line portion of the vicinity of two nodal points of the vibrating body, for example, a substantially rectangular frame-shaped supporting member is secured. The supporting member is formed into a body by means of etching or press molding. In this case, long sides of the supporting member are formed so as to extend in an axial direction of the vibrating body. Short sides of the supporting member are bonded to the vibrating body by securing means such as welding, adhesives or soldering.

15 Claims, 3 Drawing Sheets

SUPPORTING STRUCTURE OF VIBRATOR

This application is a continuation of application Ser. No. 08/443,194, filed on May 17,1995 now abandoned.

BACKGROUND OF THE INVENTION

1. Field of the Invention

The present invention relates to a supporting structure of a vibrator, and more particularly, to the supporting structure of the vibrator used in a vibrating gyroscope applicable in a navigation system, which detects a rotational angular velocity to locate a moving body for adequate guidance, or in a damping system such as an anti-hand-vibration device which detects an external vibration for adequate vibration control.

2. Description of the Prior Art

FIG. 5(A) is a perspective view showing an example of a conventional vibrating gyroscope which is a background of the present invention, and FIG. 5(B) is a sectional view taken along a line VB—VB of FIG. 5(A). The vibrating gyroscope 1 comprises a vibrator 2. The vibrator 2 includes, for example, a substantially regular triangular prism-shaped vibrating body 3. On three side faces of the vibrating body 3, piezoelectric elements 4a, 4b and 4c are formed respectively. The three piezoelectric elements 4a, 4b and 4c include piezoelectric layers 5 respectively consisting of ceramics and the like. On both faces of the piezoelectric layers 5, electrodes 6 are formed respectively. One side of the electrode 6 is bonded to the vibrating body 3 by means of adhesives and the like. Meanwhile, on a ridge-line portion in the vicinity of two nodal points of the vibrating body 3, two supporting members 7a and 7b are secured respectively. The two supporting members 7a and 7b are formed with, for example, a substantially U-shaped metal wire, and are secured to the vibrating body 3 by means of welding or adhesives. The supporting members 7a and 7b are arranged such that, their end portions extend in a direction perpendicular to an axis of the vibrating body 3. The end portions of the supporting members 7a and 7b are fixed to a supporting base plate (not shown).

In the vibrating gyroscope 1, an oscillation circuit (not shown) is connected between the piezoelectric elements 4a, 4b and the piezoelectric element 4c. The vibrating body 3 is bent and vibrated in a direction perpendicular to a face of the piezoelectric element 4c by the oscillation circuit. When the vibrating body 3 rotates about its axis in this state, the bending and vibrating directions change due to a Coriolis force. Thereby, a difference between output signals of the piezoelectric elements 4a and 4b is produced. Thus, a rotational angular velocity can be detected by measuring the output voltage difference between the piezoelectric elements 4a and 4b.

When applying the vibrating gyroscope 1 to a navigation system of an automobile, the vibrating body 3 is arranged such that its axis is directed in a perpendicular direction, as shown in FIG. 6, to detect a rotational direction of the automobile.

However, due to uneven road conditions, the automobile tends to vibrate in the perpendicular direction. In the case of arranging the axis of the vibrating body 3 in the perpendicular direction, the two supporting members 7a and 7b are arranged in a horizontal direction. And hence, the strength of the two supporting members 7a and 7b becomes weaker against a vibration in the perpendicular direction. Since the two supporting members 7a and 7b are fixed respectively to the vibrating body 3 or the supporting base plate, fixing works tend to increase.

SUMMARY OF THE INVENTION

It is, therefore, a primary object of the present invention to provide a supporting structure of a vibrator, whereby a sufficient strength is obtained even when vibration is applied in an axial direction of the vibrating body, and fixing works of a supporting member can be reduced.

In order to attain the above-mentioned object, the present invention is directed to a supporting structure of a vibrator comprising, a vibrator having a columnar vibrating body, and a supporting member is secured in the vicinity of two nodal points of the vibrating body and characterized in that the supporting member is formed in a body.

The supporting member is preferably formed into a frame. In this case, the supporting member is preferably formed into a substantially rectangular frame.

The supporting member may be formed such that, long sides of the substantially rectangular frame extend in the axial direction of the vibrating body from vertexes of the frame. It is also possible to form the supporting member such that, short sides of the substantially rectangular frame extend in a widthwise direction of the vibrating body from vertexes of the frame.

The vibrating body is preferably formed into a regular triangular prism-shaped configuration.

According to an above-mentioned configuration, since the supporting member is formed into a body and is fixed to the vibrating body, even when the vibration is applied in the axial direction of the vibrating body, a vibrating force is relaxed in a lengthwise direction of the supporting member.

According to the present invention, when vibration is applied in an axial direction of the vibrating body, since the vibrating force is relaxed in the lengthwise direction of the supporting member, a large strength can be obtained as compared with the case of supporting in a perpendicular direction of the supporting member. And hence, the strength of the supporting member is not deteriorated against a vibration in the perpendicular direction of an automobile, thus it is suitable in a navigation system of the automobile. It is also possible to manufacture easily in a large quantity at low cost, by forming the supporting member in a body. Furthermore, the fixing works can be reduced, results in a partial cost down and eventually in cutting the cost of the vibrating gyroscope.

The above and other objects, features, aspects and advantages of the present invention will become more apparent by the following detailed descriptions of the embodiments made with reference to the drawings.

DESCRIPTION OF THE PREFERRED EMBODIMENTS

Figure 1:
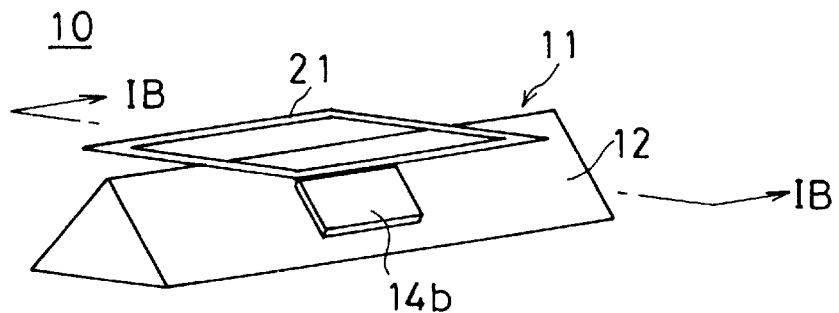
FIG. 1(A) is a perspective view showing an example of a vibrating gyroscope of the present invention.
FIG. 1(B) is a sectional view taken along a line IB—IB of FIG. 1(A).
Figure 1:
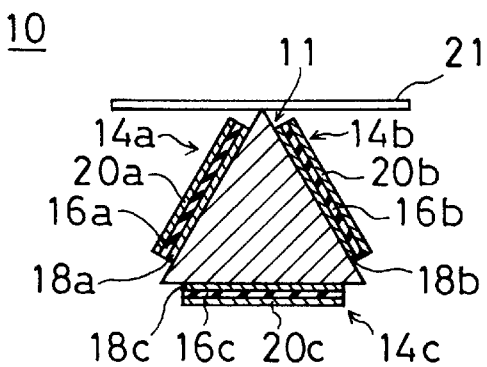

FIG. 1(A) is a perspective view showing an example of a vibrating gyroscope of the present invention, and FIG. 1(B) is a sectional view taken along a line IB—IB of FIG. 1(A). The vibrating gyroscope 10 comprises, a vibrator 11. The vibrator 11 includes, for example, a substantially regular triangular prism-shaped vibrating body 12. The vibrating body 12 is formed with, for example, a constant-elastic metal materials such as elinvar, or materials generally generating a mechanical vibration such as quartz, glass, crystal, ceramics and the like. On three side faces of the vibrating body 12, piezoelectric elements 14a, 14b and 14c are formed respectively.

The piezoelectric element 14a includes, a piezoelectric layer 16a consisting of, for example, ceramics and the like. On both faces of the piezoelectric layer 16a, electrodes 18a and 20a are formed. One electrode 18a is bonded to the side face of the vibrating body 12. Similarly, the piezoelectric elements 14b and 14c include piezoelectric layers 16b and 16c, respectively. On both faces of the piezoelectric element 16b, electrodes 18b and 20b are formed, and on both faces of the piezoelectric element 16c, electrodes 18c and 20c are formed. The electrodes 18b and 18c on one face of the piezoelectric elements 14b and 14c are bonded to the side faces of the vibrating body 12.

On a ridge-line portion of the vibrating body 12 in the vicinity of two nodal points of the vibrating body 12, a supporting member 21 is fixed. The supporting member 21 is formed into a substantially rectangular frame in a body by means of etching or press molding. Long sides of the supporting member 21 are formed so as to extend in an axial direction of the vibrating body 12. Short sides of the supporting member 21 are fixed to the vibrating body 12 by securing means such as welding, adhesives or soldering. The long sides of the supporting member are fixed to a supporting base plate (not shown) mounted on a case (not shown).

Figure 2:
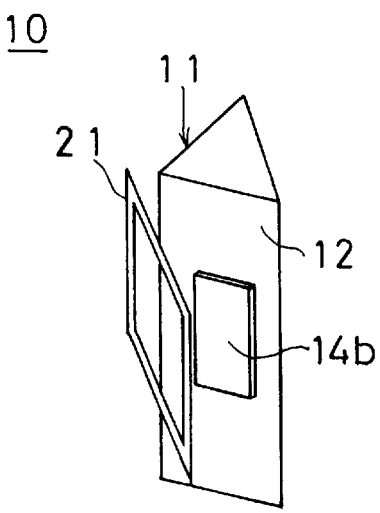
FIG. 2 is a perspective view showing a state where a vibrating gyroscope shown in FIG. 1 is fixed in a perpendicular direction.

The vibrating gyroscope 10 is used, for example, in a navigation system installed on an automobile and the like. In this case, in order to measure a rotational direction of the automobile, as shown in FIG. 2, the vibrating gyroscope 10 is arranged such that, an axis of the vibrating body 12 is directed in a perpendicular direction. An oscillation circuit (not shown) is connected between the piezoelectric elements 14a, 14b and the piezoelectric element 14c. The vibrating body 12 is bent and vibrated in a direction perpendicular to a face of the piezoelectric element 14c by the oscillation circuit. When the automobile is moved in the rotational direction in this state, a rotational angular velocity about the axis of the vibrating body 12 is applied on the vibrating body 12. Thereby, a Coriolis force functions on the vibrating body 12, and the bending and vibrating direction of the vibrating body 12 changes. Hence, a difference between output signals of the piezoelectric elements 14a and 14b is produced. Thus, the rotational angular velocity applied on the vibrating body 12 can be detected by measuring the output signal difference of the piezoelectric elements 14a and 14b.

When applying the vibrating gyroscope 10 to the navigation system of the automobile, by a vibration of the automobile in the perpendicular direction due to uneven road conditions, the vibrating body 12 vibrates in an axial direction. In the vibrating gyroscope 10, since the long sides of the supporting member 21 are formed in a body so as to extend in the axial direction of the vibrating body 12, the axial vibration of the vibrating body 12 is relaxed in a lengthwise direction of the supporting member 21. Hence, a large strength can be obtained against the axial vibration of the vibrating body 12 as compared with the conventional vibration gyroscope, in which the vibrating body 12 is supporting by separate supporting members at respective nodal points.

Since the supporting member 21 is formed in a body by means of etching or press molding, it can be manufactured easily in a large quantity at low cost. Besides, as compared with the case of fixing the separate two supporting members respectively to the vibrating body 12 as in the past, fixing works can be reduced.

Figure 3:
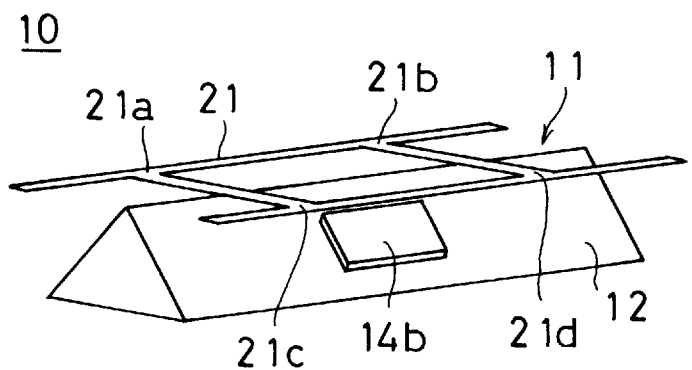
FIG. 3 is a perspective view showing another embodiment of the present invention.

As a structure of the supporting member 21, as shown in FIG. 3, the long sides of the substantially rectangular frame may be formed to extend in the axial direction of the vibrating body 12, from vertexes portions 21a, 21b, 21c and 21d of the frame, and fixed to a supporting base plate and the like at their end portions.

Figure 4:
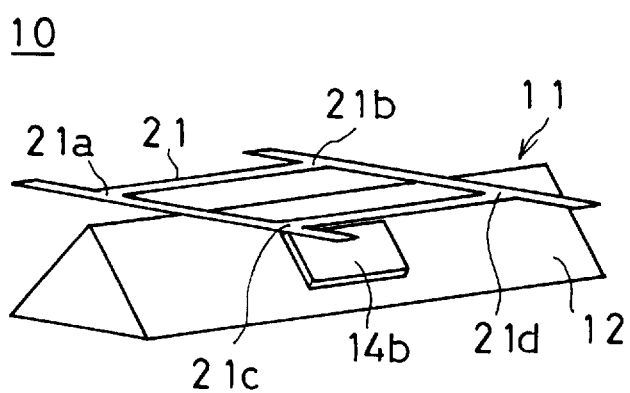
FIG. 4 is a perspective view showing still another embodiment of the present invention.
Figure 5A:
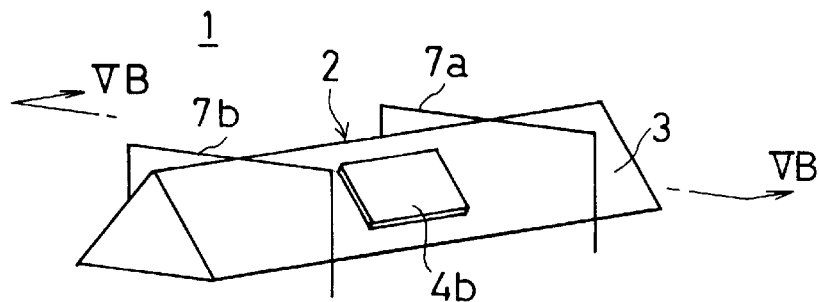
FIG. 5(A) is a perspective view showing an example of vibrating gyroscope using a conventional supporting structure of a vibrator which is a background of the present invention.
Figure 5B:
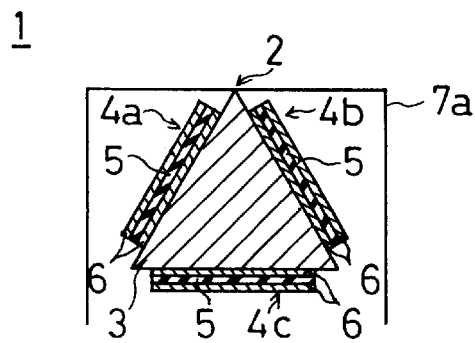
FIG. 5(B) is a sectional view taken along a line VB—VB of FIG. 5(A).
Figure 6:
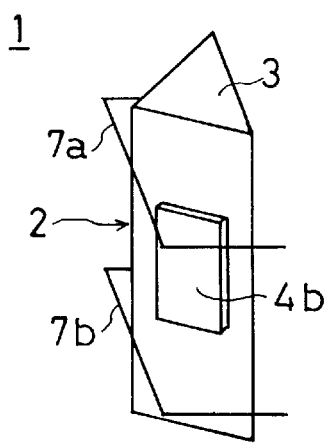
FIG. 6 is a perspective view showing a state where a vibrating gyroscope shown in FIG. 5 is fixed in a perpendicular direction.

As a structure of the supporting member 21, as shown in FIG. 4, the short sides of the substantially rectangular frame may be formed to extend in the widthwise direction of the vibrating body 12, from the vertexes portions 21a, 21b, 21c, and 21d of the frame, and fixed to the supporting base plate and the like at their end portions.

In the above-mentioned embodiments, though the substantially regular triangular prism-shaped vibrating body 12 is used, as a shape of the vibrating body 12, other columnar shapes such as a quadrangular prismatic shape or a cylindrical shape may be used. The number of piezoelectric elements is not restricted to three, it may be increased or decreased when necessary.

While, the present invention has been particularly described and shown, it is to be understood that such description is used merely as an illustration and example rather than limitation, and the spirit and scope of the present invention is determined solely by the terms of the appended claims.

What is claimed is:

1. A supporting structure of a vibrator, comprising:
   a vibrator having a columnar vibrating body, said body having ridge-line portions, one of said ridge-line portions having mounting points; and
   a single supporting member is directly mounted on the mounting points in a vicinity of two nodal points of said vibrating body, said supporting member formed as a unitary body,
   wherein said vibrator is supported solely by said single supporting member.

2. A supporting structure of a vibrator in accordance with claim 1, wherein said supporting member is formed into a frame.

3. A supporting structure of a vibrator in accordance with claim 2, wherein said supporting member is formed into a substantially rectangular frame.

4. A supporting structure of a vibrator in accordance with claim 3, wherein said supporting member is formed such that, long sides of said substantially rectangular frame extend in an axial direction of said vibrating body from vertexes of said frame.

5. A supporting structure of a vibrator in accordance with claim 3, wherein said supporting member is formed such that, short sides of said substantially rectangular frame extend in a widthwise direction of said vibrating body from vertexes of said frame.

6. A supporting structure of a vibrator in accordance with claim 3, wherein said vibrating body is formed into a regular triangular prism-shaped configuration.

7. A supporting structure of a vibrator in accordance with claim 4, wherein said vibrating body is formed into a regular triangular prism-shaped configuration.

8. A supporting structure of a vibrator in accordance with claim 5, wherein said vibrating body is formed into a regular triangular prism-shaped configuration.

9. A supporting structure of a vibrator according to claim 1, wherein said supporting member, which is formed as the unitary body, has two lateral portions of narrow width and two longitudinal portions of narrow width, said lateral and longitudinal portions formed of a same material.

10. A supporting structure of a vibrator according to claim 9, wherein one of said ridge-line portions has two mounting points.

11. A supporting structure of a vibrator according to claim 10, wherein said lateral portions extend in a lateral direction of the columnar or vibrating body.

12. A supporting structure of a vibrator according to claim 11, wherein an intermediate portion of one of said lateral portions is directly mounted on one of said mounting portions.

13. A supporting structure of a vibrator according to claim 12, wherein an intermediate portion of the other of said lateral portions is directly mounted on the other of said mounting portions.

14. A supporting structure of a vibrator according to claim 13, wherein said two longitudinal portions extend in a longitudinal direction of said columnar vibrating body.

15. A supporting structure of a vibrator comprising:

a vibrator having a columnar vibrating body, said body having ridge-line portions, one of said ridge-line portions having two mounting points; and a single supporting member is directly mounted on the two mounting points in a vicinity of two nodal points of said vibrating body, said supporting member formed as a unitary body having two lateral portions of narrow width and two longitudinal portions of narrow width, said lateral and longitudinal portions formed of a same material, said lateral portions extending in a lateral direction of said columnar vibrating body, said two longitudinal portions extending in a longitudinal direction of said columnar vibrating body, an intermediate portion of one of said lateral portions is directly mounted on one of said mounting portions, an intermediate portion of the other of said lateral portions is directly mounted on the other of said mounting portions, and wherein said vibrator is supported solely by said single supporting member.

* * * * *